B. H. BURGESS & L. CAMP.
AUTOMATIC CHOKER VALVE.
APPLICATION FILED AUG. 9, 1910.
997,900.
Patented July 11, 1911.
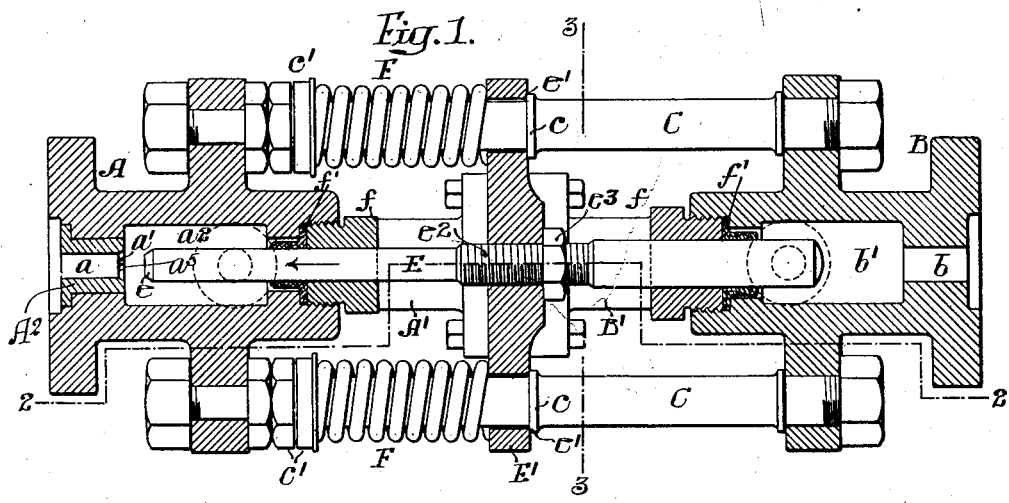
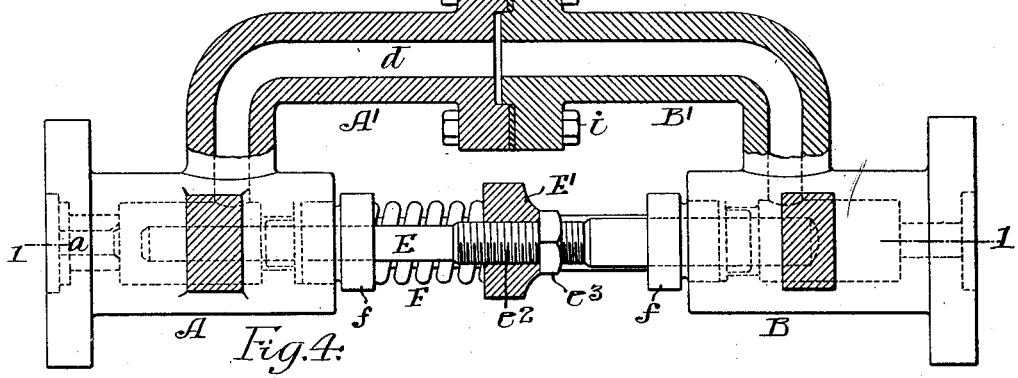
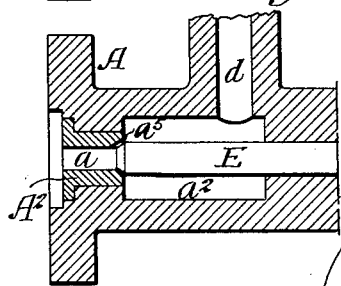
Inventors,—
Benjamin H. Burgess.
Leroy Camp.

UNITED STATES PATENT OFFICE.

BENJAMIN H. BURGESS, OF CHARLOTTE, NORTH CAROLINA, AND LEROY CAMP, OF MONTGOMERY, ALABAMA.

AUTOMATIC CHOKER-VALVE.

997,900.  Specification of Letters Patent.  Patented July 11, 1911.

Application filed August 9, 1910. Serial No. 576,290.

*To all whom it may concern:*

Be it known that we, BENJAMIN H. BURGESS and LEROY CAMP, citizens of the United States, and residents, respectively, of Charlotte, county of Mecklenburg, State of North Carolina, and Montgomery, county of Montgomery, State of Alabama, have invented certain Improvements in Automatic Choker-Valves, of which the following is a specification.

Our invention relates to certain improvements in valves located in the supply passage leading from a pump or other supply of fluid under pressure to a press.

The object of the invention is to construct a valve for controlling the fluid as it passes from the pump to the press, so that it will allow the free flow of fluid until a certain pressure is reached, then will choke the flow, only allowing a very small stream to pass through the valve.

A valve of this type is especially applicable for use in the fluid supply passages leading from a pump to a hydraulic cotton seed or linseed oil press, as the desired initial pressure can be quickly reached, and as soon as the oil starts to flow the flow of fluid to the press can be reduced. Thus the increase of pressure will be slow, preventing the bursting of the press cloths and obviating unnecessary strains from the press.

In the accompanying drawings;—Figure 1, is a longitudinal sectional view on the line 1—1 Fig. 2; Fig. 2, is a sectional view on the line 2—2 Fig. 1; Fig. 3, is a transverse sectional view on the line 3—3 Fig. 1; Fig. 4, is a sectional view of a portion of the valve showing the valve stem resting against the seat, and Fig. 5, is a detached perspective view of the thimble forming the valve seat.

A is an inlet casing, B is an outlet casing. These two casings are connected together by rods C, and in extensions A' and B' of the casings is a passage $d$ through which the fluid passes from one end of the valve to the other.

$a$ is the inlet passage in the casing A, and in this passage is a thimble $A^2$ provided with a valve seat $a'$.

$b$ is the outlet passage in the casing B, which communicates with the pipe leading to the press or other fluid actuated apparatus.

E is a valve stem having a beveled end $e$ mounted in the chamber $a^2$ of the casing A, and adapted to close against the seat $a'$. The opposite end of the valve stem E is of large diameter and projects into the chamber $b'$ of the casing B. The stem passes through stuffing boxes $f$—$f$ screwed into the ends of the casings A and B, and against leather crimps $f'$—$f'$, to prevent leakage of fluid from the chambers $a^2$ and $b'$. Mounted on the rods is a cross head E' which is perforated at each end at $e'$ for the passage of the rods C—C. Flanges $c$ on the rods C limit the movement of the cross head in one direction, and between the cross head and adjustable nuts $c'$ on the rods C are springs F and the amount of pressure upon the cross head can be regulated by adjusting said nuts $c'$. The valve stem can be adjusted in the cross head, as its screw threaded portion $e^2$ is adapted to a threaded opening in the cross head; and a jam nut $e^3$ locks the valve stem in the position to which it is adjusted.

The two extensions A' and B' are connected together by bolts $i$, and a leather washer $i'$ is placed between the extensions so as to make a tight joint. The valve seat $a'$ has a leakage slot $a^5$ therein, Fig. 5, so that while the volume of fluid is greatly reduced it is never entirely cut off. The leakage slot or opening can be either in the seat as in Fig. 5, or in the end of the valve stem.

The operation of the valve is as follows: The valve in the first place is designed particularly to regulate the pressure and flow of oil into all hydraulic presses where the pressure must be applied gradually, or where the pressure should be applied very fast to a certain point and then choked off and applied gradually, as in cotton seed oil and linseed oil mills. In the operation of presses of this type it is very necessary for the pressure to be applied as quickly as possible up to the time that the oil starts to flow. This is done to keep the cotton seed meats from cooling any more than possible after being put in the press. After the oil starts to flow pressure must be applied very slowly. This is done to prevent the press cloth from bursting from an excess of oil being forced through it all at once, which happens when the pressure is not choked down and applied gradually.

The action of the valve is as follows: The press having been filled with oil cake the outlet valve from the press is closed and the inlet valve is opened. This being done the hydraulic pump is started automatically. My improved choker valve is located in the line of pipe between the pump and the press, with the small end of the valve stem toward the hydraulic pump. The oil flows through the chamber $a^2$ of the valve, through the passages $d$ into the chamber $b'$, and from there into the pipe that carries to the press. The instant pressure in the press cylinder begins to rise the valve would close if it were not for the springs F—F which work against the cross head E' and thus keep the valve stem E from closing. As the pressure rises the automatic valve gradually closes until the valve stem E is finally closed against the seat $a'$. The pressure at which this closing takes place is regulated by the springs F. The pressure may be anywhere between 100 to 4,000 pounds in the present instance, but usually the valve is set to close at about 1000 pounds. When the valve closes it does not cut off the flow of oil altogether, as the oil will flow through the small leakage slot $a^5$ in the face of the valve. The valve now being closed and the flow of oil being gradually reduced the pressure in the cylinder rises very slowly. On the other hand the pressure in the pipe between the choker valve and the pump rises very fast until the extreme pressure that is desired is reached and the pump is slowed down or very nearly stopped by means of an ordinary governor with which all hydraulic pumps are equipped. This governor is actuated by the pressure in the pipe between the pump and the choker valve. The pressure in this pipe having reached the desired point, would stop the pump if it were not for the fact that the oil escapes very slowly through the slot $a^5$ in the seat of the valve to the cylinder of the press, slowly raising the pressure in the cylinder until it equals the pressure in the line of pipe between the pump and choker valve. As soon as the desired pressure in the press cylinder has been reached the pump is automatically stopped by the governor. To complete the scale of operations the inlet valve which is placed in the line of pipe between the choker valve and the press is now closed and the outlet valve opened, and the pressure on the press released. After the cakes in the press have been removed and the press charged, the outlet valve is closed and the choker valve seat E will jump open by the pressure of the springs, and also by the release of the pressure against the large end of the valve stem. The choker now remains open, the oil will flow freely through the valve until the pressure in the press cylinder reaches the point at which the valve is set to choke, after which it works as above described.

When the valve closes against its seat it remains closed during the entire period of time that it is choking. This is due to the fact that the end of the stem E which is in the chamber $b'$ is larger than the end of the valve stem in the chamber $a'$. The low pressure in the chamber B' has a larger area for the stem to work on, therefore it keeps the stem against the seat after it once overcomes the resistance offered by the springs.

The valve is perfectly automatic in all of its actions and requires no attention after being once set to choke at the right point. The slot in the seat on the end of the valve stem will not clog on account of the impurities in the oil, as it is washed clean each time the valve opens, by the flow of oil through the valve. The valve greatly reduces the strain on the press and press cloths, by applying the pressure gradually instead of all at once, as heretofore, and it greatly reduces the amount of press cloth used.

We claim:—

1. The combination in a choker valve of an inlet and outlet casing, each having a chamber and each having a passage forming communication between the two chambers, a valve stem, a cross head on the valve stem, and springs adapted to retain the valve stem in its open position, the end of the valve stem in the inlet chamber being less in diameter than the end of the valve stem in the outlet chamber, and a leakage port in the inlet chamber, so that while the pressure is considerably reduced the fluid will leak past the valve when closed.

2. The combination of two casings spaced apart, each having a chamber therein and each casing having an extension, with a passage therein, the two passages of the casing being connected so as to form communication between the two chambers; an inlet opening in one chamber, an outlet opening in the other chamber, a cross head located between the valves, a valve stem secured to the cross head and extending into both valve chambers, the end of the valve stem in the inlet casing being formed to close against the valve seat in said casing, a leakage port in the inlet valve casing to allow a small amount of fluid to leak past the valve when closed, and means for forcing the valve off its seat when the pressure is released.

3. The combination in a valve, of an inlet and an outlet casing, each casing having a chamber therein and having a passage forming connection between the two chambers, a stem extending into each chamber, that portion of the stem and the outlet chamber being greater in diameter than the portion of the valve in the inlet chamber, two rods connecting the two casings, a cross head secured to the valve stem and adapted to slide on the rods, a spring mounted on each rod between the cross head and lugs on the inlet casing, and means for adjusting the springs.

4. The combination in an inlet and an outlet casing, each having a chamber therein, and each having a passage forming a communication between the two chambers, said chambers being spaced apart, a cross head, guide rods for the cross head attached to the two casings, a valve stem adapted to the two casings, said valve stem adapted to packing boxes in each casing and extending into the chambers therein, the portion of the valve in the outlet chamber being greater in diameter than the portion of the valve in the inlet chamber, said stem being threaded and adapted to a threaded opening in the cross head, a seat at the end of the inlet chamber against which the valve stem can close, a spring mounted on each rod and resting against the cross head, means for adjusting the springs, a leakage port through which the fluid will pass into the inlet chamber when the valve stem is seated.

5. The combination of an inlet and an outlet casing, rods connecting the two casings, an extension on each casing, each extension having a passage therein, and means for coupling the two extensions, a cross head arranged to slide on the rods, springs on the rods bearing against one side of the cross head, a valve stem mounted on the cross head, said valve stem extending into chambers formed in the two casings, one end of the valve stem being greater in diameter than the other, said inlet casing having a leakage port, so that when the valve is closed against the seat fluid will leak into the inlet chamber.

6. The combination of two casings spaced apart, each casing having a chamber therein, an extension on each casing having a passage therein, means for coupling the two extensions so that the passage will be formed between the inlet and the outlet chambers, a valve seat in the inlet chamber, a valve rod extending into the two chambers, and adapted to close against the valve seat, a leakage port in the valve seat, rods connecting the two casings, a cross head secured to the valve stem arranged to slide on the rods, springs on the rods tending to force the valve off its seat.

7. The combination in a choker valve of an inlet casing and an outlet casing, each casing having a chamber therein and each casing having an extension, with a passage therein, means for securing the two extensions together, so that the passages will form a communication between the two chambers, rods extending from one casing to another, a cross head adapted to slide on said rods, a flange on each rod to limit the movement of the cross head in one direction, and springs on each rod bearing against the cross head, and means for adjusting each spring, a valve stem adjustably mounted in the cross head and extending into the chamber in each casing, stuffing boxes in each casing through which the valve stem extends, a thimble in the inlet casing, a seat formed in the thimble against which the valve stem closes, said thimble having a leakage port so that when the valve is closed against the seat a certain amount of fluid will pass the valve.

In testimony whereof, we have signed our names to this specification, in the presence of two subscribing witnesses.

BENJ. H. BURGESS.
LEROY CAMP.

Witnesses to the signature of Benjamin H. Burgess:
F. F. JONES,
BERNARD C. GOLDEN.

Witnesses to the signature of Leroy Camp:
M. R. SIMS,
J. F. HENDRICK.

---

Copies of this patent may be obtained for five cents each, by addressing the "Commissioner of Patents, Washington, D. C."